Figures 1, 2:
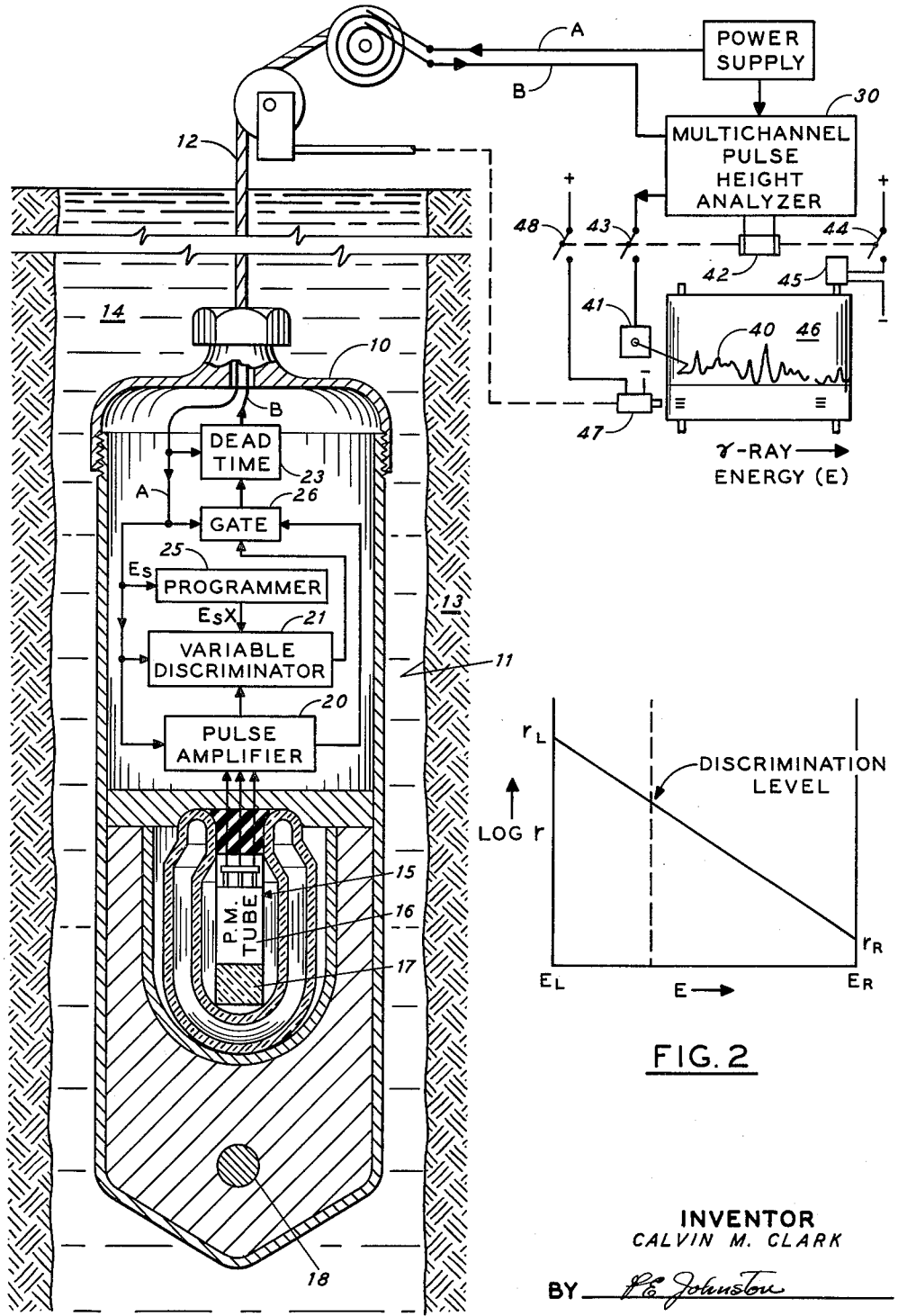

Dec. 28, 1965   C. M. CLARK   3,226,544
WELL BORE GAMMA-RAY SPECTRUM EQUALIZATION
Filed March 30, 1962   2 Sheets-Sheet 1

INVENTOR
CALVIN M. CLARK
BY
ATTORNEYS

Dec. 28, 1965  C. M. CLARK  3,226,544
WELL BORE GAMMA-RAY SPECTRUM EQUALIZATION
Filed March 30, 1962  2 Sheets-Sheet 2

INVENTOR
CALVIN M. CLARK
BY
ATTORNEYS

United States Patent Office 3,226,544
Patented Dec. 28, 1965

3,226,544
WELL BORE GAMMA-RAY SPECTRUM
EQUALIZATION
Calvin M. Clark, Fullerton, Calif., assignor to Chevron Research Company, a corporation of Delaware
Filed Mar. 30, 1962, Ser. No. 183,858
9 Claims. (Cl. 250—71.5)

This invention relates to the art of using gamma rays to log oil wells. In particular, it teaches an improved method to record at the earth's surface spectra of gamma rays generated in a prospective oil-producing formation by instruments in the well bore.

An object of the invention is to record gamma-ray spectra at the earth's surface by a system that makes better use of a logging cable of limited power and frequency characteristics to transmit electrical pulses up the cable to a multichannel pulse analyzer at the earth's surface. In accordance with the invention, the high-energy portion of each gamma-ray spectrum is emphasized without substantial increase in measuring time by (a) progressively increasing the minimum ampltiude of electrical pulses sent up the cable and (b) preventing overlap of successive pulses during transmission of the lowest energy pulses.

One of the chief problems in gamma-ray spectral logging is to secure the data at a practical rate. A gamma-ray spectrum is actually a statistical summary showing the relative frequencies of occurrence of the various energies of many individually counted gamma rays. A spectrum is divided into a large number of energy channels, for instance 100. Each of these 100 channels must collect enough gamma rays to make the subtotal for that channel of statistical significance. For purposes of interest here, a maximum of 1,000 counts per channel might be required, so that a total of at least 100,000 counts would have to be made for each spectrum. Now, in gamma-ray spectroscopy well logging, it is desired also that spectra be collected for as many depth intervals as possible, and yet the detecting instrument must stay in each depth interval long enough to collect at least 100,000 counts. This imposes an upper limit on the speed with which the logging instrument may be moved along the hole. Apparently, then, the commercial value of a spectral logging system depends upon its ability to detect and classify as many pulses as possible per unit time.

In gamma-ray spectroscopy logging systems now being developed, an electrical pulse is generated for each gamma ray absorbed in a scintillation crystal. The gamma ray is converted to a light pulse in the crystal, and this light pulse is in turn converted to an electrical pulse by a photomultiplier tube and an amplifier. At least one characteristic of the resulting pulse, such as amplitude or length, represents the interaction energy between the gamma ray and the crystal. While these pulses could be collected and counted in the well bore, multichannel analyzers are so complex that they are not reliable enough for commercial well logging service. Additionally, the user of the logging service demands a record while the logging instrument is in the well bore, so that he knows that the instrument is working. For this reason, it is necessary to transmit the pulses from the depth at which they are collected up to a recorder at the earth's surface. The pulses are classified by the recorder into their representative energy channels. Therefore, it is important that the cable being used should have a large information-transmitting capacity. Now it is known that information-transmitting capacity is proportional to frequency band width (other things being equal); at the present time, and in the foreseeable future, it is difficult, if not impossible, to build well logging cables that have the mechanical strength to support and move the necessary instruments at depths of, say, 10 to 15 thousand feet and still have the desirable electrical properties for high-frequency transmission. The best present well logging cables can transmit about 20,000 randomly occurring pulses per second.

As already mentioned, a gamma-ray spectrum may consist of 100 energy channels, and in each channel 1,000 counts of that particular energy may be needed to make the spectrum statistically reliable. Therefore, there may be 100,000 counts whose energies are represented in a single spectrum. However, this number is still small compared to the total number of pulses that must be sorted out to select the counts represented in the spectrum. The reason for this is that the counting rates in the various channels differ widely. For instance, the counting rate in the lowest energy channel might be 1,000 times as great as that in the highest energy channel. If so, then 1,000,000 low-energy pulses would need to be received and sorted out during the time that the required 1,000 high-energy pulses were being received. Taking into account 98 other energy channels between the lowest energy and the highest energy channels, it turns out, in a typical case, that about 14 million total pulses would have to be received and sorted out in order to be sure of receiving 1,000 pulses in the highest energy channel. Obviously, if only 100,000 pulses are needed to represent the final spectrum, it is objectionable to handle 14 million, if one can avoid it.

If 14 million pulses were to be passed over a cable that could faithfully transmit only 20,000 randomly occurring pulses per second, the time required would be 12 minutes for the pulse transmission alone. A logging operation in which the tool had to stay at each depth interval of, say, a few feet, for 12 minutes, would require many hours for a total interval of several thousand feet.

From the above considerations, the main problem to be solved can be summarized as follows: Fourteen million electrical pulses are to be sorted out, and 100,000 of them, representing 100 energy interval channels, are to be selected, analyzed, and counted to produce a statistically accurate gamma-ray spectrum. The pulses have to be transmitted from somewhere in a borehole up to the surface through a cable that can handle only 20,000 pulses per second. It is desired to do this in much less than the straightforwardly calculable time of 12 minutes. (These numbers merely represent one probable practical case; they cannot represent all conceivable situations. However, the method of solution of the problem which constitutes the present invention has general applicability.)

Prior to this invention there has been no straightforward, obvious solution to the stated problem. If the time of transmission is to be reduced, it would seem that the pulse rate would have to be increased, and if the cable is already fully loaded, that is impossible unless some of the pulses can be sorted out before they are transmitted up the cable. Sorting of the pulses also appears difficult if no part of the multichannel pulse-height analyzer is located in the downhole assembly. (Because of inaccessibility of the parts for adjustment and general unreliability, downhole pulse analysis is highly undesirable.)

The object of the present invention is to provide a method and apparatus to increase the effective rate of transmission of electrical pulses uphole to a surface pulse-height analyzer without exceeding the capacity of the already fully loaded cable.

Another object is to produce a gamma-ray spectrum in which the various energy channels of the spectrum have approximately equal numbers of collected counts so that the spectrum background is essentially leveled.

Thus, the peaks appear above a level background instead of a background of from a million counts at the low-energy end of the spectrum to a thousand at the high-energy end. These peaks represent relative abundance of certain radioactivated isotopes. Where the order of only 10 more counts in one channel than those recorded in adjacent channels define the peak, leveling of the background greatly aids one to see and measure relative abundance of specific gamma rays. One, of course, can infer the presence of specific isotopes created in an earth formation from these peaks in the gamma-ray spectrum.

The method by which these objects are achieved uses two operations in the downhole instrument, either one of which if used alone would actually decrease the effective rate of transmission rather than increase it. But when they are used together they result in a remarkably effective increase.

The first of these operations is a variable discriminating operation that progressively desensitizes the transmitting circuit to all pulses having energies below a predetermined energy throughout the recording of a spectrum. In this progressive desensitizing the discriminator does not sort the pulses that it selects; it merely divides all the pulses into two classes – (1) those pulses having energies below a predetermined energy and (2) those pulses having energies above that predetermined energy. Only pulses of the second class are transmitted. In the present invention this predetermined energy level of discrimination is varied during the collection of pulses for each spectrum, and this variable discrimination is in addition to conventional discrimination to remove all low-energy pulses below a selected level. It will be appreciated that a discriminating function by itself would prolong the time required to transmit a fixed number of pulses.

The second of the above-mentioned operations is a dead-time operation, as described in U.S. Patent 2,883,548 to P. E. Baker and S. B. Jones. This operation deadens, or disables, the transmission circuit for a predetermined interval of time after any pulse enters the circuit, so that during that predetermined interval of time (the so-called dead time) no additional pulses will be sensed or transmitted. It will be appreciated that this function discards, or disregards, all pulses occurring during the dead-time intervals; this by itself prolongs the time required to transmit a fixed number of pulses.

As distinguished from these earlier systems to overcome the cable problem in nuclear spectroscopy logging, the present invention uses variable discrimination and the dead-time operations simultaneously. At the beginning of the collection of pulses for a spectrum, the discrimination energy level is set at its lowest value so that all the pulses from the lowest to the highest energy are permitted to pass on to the dead-time circuit. When the pulses are passed to the dead-time circuit at their maximum rate, the dead-time circuit operates at its maximum rate and produces the maximum amount of dead time. In the practice of this invention, the initial rate may be so high that the dead-time intervals occupy, say, 90 percent of the elapsed time. If the circuit is dead 90 percent of the time, then on the average only 10 percent of the pulses are getting through. The dead-time circuit is therefore acting as if it were a scaler with a scaling factor of 10. It will be appreciated that under these particular conditions the rate of collection of pulses by the circuit preceding the dead-time circuit may be as high as 10 times the maximum permissible cable transmission rate. It might therefore be as high as 200,000 pulses per second.

At the beginning of the collection of pulses for a spectrum, when the discrimination energy level is set at its lowest value, all pulses pass, but the majority of these pulses are of low energy. Under a typical condition, six percent of the passed pulses fall in the first channel, or the first one percent of the energy range. Using figures already given, one may calculate that the first channel will have its required 1,000 pulses in about one second, whereas in that time the last channel will have received something in the neighborhood of only one pulse. Because the pulse collection is a random process, this expectation of about one pulse means that there is a fair probability that no pulse at all will be received in the last channel in this first second.

It is now apparent that one may raise the discrimination level at least above the energy level of the first and lowest energy channels in about one second, still allowing the other channels to continue to accumulate their required approximately 1,000 pulses each. The next-to-the-lowest energy channel will be full next, and the discrimination level is then raised above the energy level of that channel. Then the third channel will become filled, and the discrimination level is raised above the third energy level, and so on.

Now, as the discrimination level is raised, and the more frequently occurring, low-energy pulses are blocked from entering the dead-time circuit, the dead-time circuit will itself operate less frequently. There will therefore be more live time, and a greater percentage of the pulses will be passed also by the dead-time circuit. One may calculate, for instance using formulas given later in this specification), that if only one-tenth of the pulses were passed by the dead-time circuit when the lowest energy pulses were being transmitted, then by the time the discriminator's energy level is one-third of the way between the lowest and highest energies, one-half of the pulses get through. When the energy level is two-thirds of the way to the highest energy, nine-tenths of the pulses get through for final transmission to the surface.

It is apparent from the above that the dead-time circuit, when preceded by the variable discriminator, acts as a type of intelligent scaler that changes its own scaling factor as the pulses become less frequent. When the pulses become relatively infrequent, the scaling function is virtually absent.

If the approximate general form of the spectrum to be collected is known in advance, as is usually the case, then the change with time of the variable discrimination level can be prescribed, as will be described below. The discrimination level can be varied so that each channel contains of the order of 1,000 counts and spectrum background is approximately level.

Of course, it is to be understood that by leveling of a spectrum is meant leveling as judged by the general background count of the spectrum. It does not mean that each channel has, say, exactly 1,000 counts. This would constitute a blank spectrum, with no peaks and no meaning. Individual differences between adjacent channels are, of course, the very things that give the spectrum its significance. These differences are not obscured when the discrimination level moves smoothly with time through all the channels.

The above paragraphs have given a general description of the operations involved in the present invention without reference to specific forms of apparatus. Usable apparatus will now be described with reference to the attached drawings. Then, a mathematical prescription will be given for programming the discrimination level to achieve a generally leveled spectrum as described qualitatively above.

In the drawings:

FIG. 1 is a schematic representation of gamma-ray spectral well logging apparatus useful in performing the method of this invention.

FIG. 2 is an "Energy vs. Number of Counts" diagram of the general form recorded in a gamma-ray spectrum using apparatus of the type shown in FIG. 1. This figure will be used to explain the discrimination method of the invention.

Figure 3:
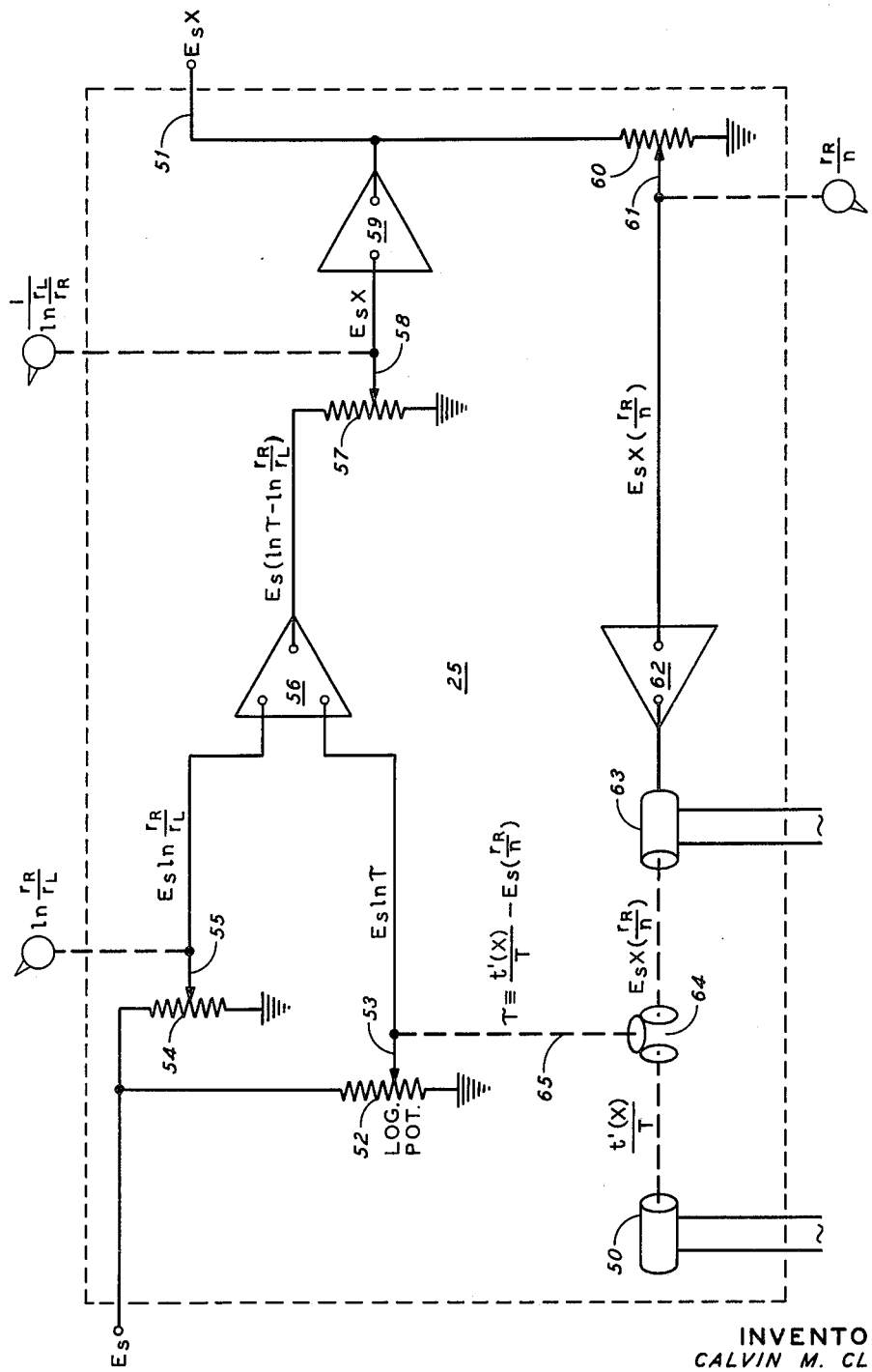

FIG. 3 is a circuit diagram of one form of programmer 25 (indicated in block form in FIG. 1) to develop the curve of FIG. 2.

Reference is made to FIG. 1, which schematically represents a downhole gamma-ray spectral logging tool 10 containing circuitary to perform the methods described above.

Tool 10 includes a housing 11, supported on the lower end of cable 12. It is raised and lowered in well bore 14 to detect gamma rays from formation 13 which are penetrated by well bore 14. The gamma rays are detected by a scintillation spectrometer 15 which includes a photomultiplier tube 16 and scintillation crystal 17. The gamma rays from formation 13 may arise from either inelastic scatter of fast neutrons or capture of thermal neutrons by constituent nuclei in the earth formation 13. To irradiate the formation, neutrons are generated in source 18. In FIG. 1, for convenience the neutron source 18 is indicated as being of the so-called chemical type (Pu-Be or Po-Be), but the source could be a downhole accelerator capable of producing safely a higher neutron flux in the well bore.

Light pulses are generated in crystal 17 when gamma rays penetrate it. These are converted into electrical pulses by photomultiplier tube 16 and amplified by amplifier 20. The output of amplifier 20 is connected to both the variable discriminator 21 and the gate 26. The pulses leaving amplifier 20 are allowed to pass through gate 26, and on to the dead-time circuit 23 if they are above a variable minimum energy level in the discriminator 21. This variable energy level is controlled by programmer 25. Dead-time circuit 23 is of the type fully described in U.S. Patent 2,883,548 to P. E. Baker and S. B. Jones.

Pulses that pass through all of the above-mentioned circuits then pass up cable 11 to multichannel pulse-height analyzer 30 at the surface. Analyzer 30 upon command, or at fixed intervals, will print out spectrum 40 through oscillograph 41, or the like. Spectrum 40 may be thought of as representing counts collected in, say, 100 adjoining energy channels. Some number, of the order of 1,000 counts, may be collected in each channel. For instance, one channel might contain 1,400 counts and another channel, 900. Both of these numbers are considered to be "of the order of 1,000." One way of controlling printout of each spectrum is indicated schematically in FIG. 1. When all channels are filled, relay 42 is energized by analyzer 30 to connect it to oscillograph 41 through contact 43. At the same time, contact 44 connects chart drive motor 45 to a source of power. The average depth at which the spectrum was measured can be recorded on chart 46 by indicator 47. This is done by contact 48 of relay 42 connecting indicator 47 to a source of power.

At this point a mathematical prescription will be given for the action of programmer 25, which controls the progressive increase discrimination level of discriminator 21 throughout the spectrum-recording operation. It is convenient to derive the prescription in two major steps, first considering the problem as if the variable discriminator were just to be used alone, without the dead-time circuit, to produce a leveled spectrum. Then the prescription will be completed, taking into account the variable scaling action of the dead-time circuit.

In order to define how the discrimination level shall move, it is necessary to make an assumption about the general form of the spectrum to be investigated. It is known empirically that the general form of a gamma-ray spectrum, not counting its peaks, is a logarithmic form as represented in FIG. 2. The logarithm of the count rate, $r$, declines linearly with increasing energy, E. The relationship graphed in FIG. 2 can be represented by the following equation:

$$r = r_L \left(\frac{r_R}{r_L}\right)^{\frac{E-E_L}{E_R-E_L}} = r_L \left(\frac{r_R}{r_L}\right)^x \text{ if } X = \frac{E-E_L}{E_R-E_L} \quad (1)$$

where
$r$ = count rate (pulses per second)
$r_L$ = left-hand rate (lowest energy rate)
$r_R$ = right-hand rate (highest energy rate)
$E$ = energy
$E_L$ = left-hand energy (lowest)
$E_R$ = right-hand energy (highest)

$$x = \frac{E - E_L}{E_R - E_L}$$

Inspection of the equation will show that when $$E = E_L, \; r = r_L$$

and when $$E = E_R, \; r = r_R$$

as it should.

First, assume that the variable discriminator is to be used to block out increasing portions of the left-hand, high frequency (low-energy) end of the spectrum. In order to produce a leveling-out effect, the discriminator edge should move so as to leave each energy region exposed for a length of time inversely proportional to its particular counting rate. Or in other words, the time the discriminator takes to reach and cover that portion should be inversely proportional to its counting rate. Let $t(x)$ be the time required to reach $x$.

$$t(x) = \frac{\text{const.}}{r(x)}$$
$$= \frac{\text{const.}}{r_L} \cdot \left(\frac{r_L}{r_R}\right)^x \quad (2)$$

Now, if the total time to reach $x=1$ (the right-hand energy) is T, the constant can be evaluated as follows:

$$T = \frac{\text{const.}}{r_L} \cdot \frac{r_L}{r_R} = \frac{\text{const.}}{r_R}$$

or $$\text{const.} = r_R \cdot T$$

So:

$$t(x)\frac{r_R}{r_L}(T)\left(\frac{r_L}{r_R}\right)^x$$
$$= \frac{r_R}{r_L}(T)\left(\frac{r_L}{r_R}\right)^{\frac{E-E_L}{E_R-E_L}} \quad (3)$$

Equation 3 is, in a mathematical sense, the prescription for the motion of the discriminator edge when there is no dead-time action. Equation 3 gives the time when the edge is supposed to be at any given energy, E.

Now, before an equation can be derived showing how the prescription of Equation 3 is modified by the introduction of a dead-time circuit, it is necessary to introduce an equation describing the scaling action of a dead-time circuit. It is easily shown that the effective scaling may be represented by Equation 4:

$$SF = \frac{N_{\text{true}}}{N_{\text{app}}} = 1 + \frac{N_{\text{true}}}{n} \quad (4)$$

where
$SF$ = an apparent scaling factor
$N_{\text{true}}$ = the (true) number of pulses per second entering the dead-time circuit
$N_{\text{app}}$ = the (apparent) number of pulses per second leaving the dead-time circuit
$n$ = the number of dead-time intervals that would fill a second if they were laid end to end In accordance with the teaching of this invention, we now consider simultaneous use of the dead-time circuit and the sliding discriminator. We choose the dead-time interval $$\frac{1}{n}$$

so that even when the entire energy interval from $E_L$ to $E_R$ is open, that is, no part is discriminated out, the scaling factor is high enough to prevent cable saturation. But then, as the discriminator moves across the energy range and the total count rate becomes significantly lowered, the scaling factor will also be lowered. For certain conditions of interest, it can turn out that the scaling produced by the dead-time circuit becomes negligible as the discriminator edge goes into the high-energy region.

We now ask how the discriminator edge should move when it is used simultaneously with the dead time circuit. One way to answer the question is to say that between any two energy values an infinitesimal distance apart say $x$ and $x+dx$, the time taken for the edge to move across the energy interval should be equal to the time it took without the dead-time circuit multiplied by the effective scaling factor. Let the new time be denoted by a prime. Then $$dt' = dt\left(1 + \frac{N_{true}}{n}\right)$$
$$= \left(\frac{r_R}{r_L}\right) \cdot T\left(\frac{r_L}{r_R}\right) \cdot \ln\left(\frac{r_L}{r_R}\right) \cdot dx \left(1 + \frac{N_{true}}{n}\right) \quad (5)$$

where, in his expression, $N_{true}$ is the net counting rate coming from the right-hand energy interval from $x$ to unity. Now, it is easy to show that if the counting rate obeys Equation 1, the net counting rate in an interval between a finite value of $x$ and unity is:

$$N = \frac{r_L}{\ln\left(\frac{r_L}{r_R}\right)}\left[\left(\frac{r_R}{r_L}\right)^x - \left(\frac{r_R}{r_L}\right)\right] \quad (6)$$

Using this expression as the "true" counting rate in Equation 5 gives:

$$dt' = \left(\frac{r_R}{r_L}\right) \cdot T \ln\left(\frac{r_L}{r_R}\right) \cdot$$
$$\left(\frac{r_L}{r_R}\right)^x \left[1 + \frac{1}{n}\frac{r_L}{\ln\left(\frac{r_L}{r_R}\right)}\left\{\left(\frac{r_R}{r_L}\right)^x - \left(\frac{r_R}{r_L}\right)\right\}\right] dx \quad (7)$$

At this point, it is appropriate to consider whether it will be necessary or useful to integrate the entire above expression. Perhaps some approximation can be made that will save labor.

Assume that the quantity $$\frac{r_R}{r_D} = \frac{1}{1000}$$

Then consider first the energy interval denoted by $$0 < x < \tfrac{1}{3}$$

In this interval, $$1 > \left(\frac{r_R}{r_L}\right)^x > \frac{1}{10}$$

So, in this interval, the curly-bracketed expression is always given to within one percent by its first term only.

In the next similar interval, $\tfrac{1}{3} < x < \tfrac{2}{3}$, the second term in the curly brackets changes from one percent to 10 percent of the first term, but at the same time the importance of the entire curly-bracketed expression is decreasing. If, for example, the required initial scaling factor is of the order of 10, then the second term of the square brackets is of the order of 10, and because that second term is very nearly proportional to $$\left(\frac{r_R}{r_L}\right)^x$$

by the time $x$ reaches $\tfrac{1}{3}$, that second term drops to $\tfrac{1}{10}$ of its original value, or about unity.

In the interval $\tfrac{1}{3} < x < \tfrac{2}{3}$, as the importance of the second term in the curly brackets increases relative to that of the first term, the combined importance of both terms decreases. At the end of this interval, the entire second term of the scaling factor is only about $\tfrac{1}{10}$, and so 10 percent of that term still makes only a one percent difference in the over-all result.

Finally, as $x$ approaches unity, the entire scaling factor approaches unity, and neither term in the curly brackets is important any more.

The above considerations indicate that it is satisfactory (under the stated assumptions) to omit the second term in the curly brackets and thereby obtain:

$$dt' = \frac{r_R}{r_L} \cdot T \ln\left(\frac{r_L}{r_R}\right) \cdot \left(\frac{r_L}{r_R}\right)^x \left[1 + \frac{1}{n}\frac{r_L}{\ln\left(\frac{r_L}{r_R}\right)}\left(\frac{r_R}{r_L}\right)^x\right] dx$$

or, $$dt' = \frac{r_R}{r_L} \cdot T \ln\left(\frac{r_L}{r_R}\right) \cdot \left(\frac{r_L}{r_R}\right)^x dx + \frac{r_R}{n} \cdot T dx \quad (8)$$

So that, finally, $$t'(x) = \frac{r_R}{r_L} \cdot T\left(\frac{r_L}{r_R}\right)^x + \frac{r_R}{n} \cdot Tx \quad (9)$$

The final expression merely has a linear term added onto the original time expression.

Equation 9, then, constitutes the mathematical prescription for the rate of movement of the discrimination level.

Calculations using Equation 9 show the remarkable result from simultaneous use of the variable discriminator and the dead-time circuit. For example, consistent with values already given, let the following numerical values be assumed:

Total counting rate (into the discriminator) (counts per second)—200,000

Cable capacity (random pulses per second)—20,000

$$\frac{\text{Lowest energy rate}}{\text{Highest energy rate}} = \frac{r_L}{r_R} = 1,000$$

Dead-time interval (seconds)—1/20,000 ($n$=20,000)

First, inserting the dead-time and the total counting rate into Equation 4, we can calculate that the apparent counting rate entering the cable will be 18,200 counts per second. This is within the cable capacity. The effective scaling factor at the beginning of the collection of a spectrum is 11.

Next we calculate the time required to collect a complete spectrum, first without the dead-time circuit, then with the dead-time circuit. If the counting rate obeys Equation 1, then, according to Equation 6, the counting rate in the 100th channel is:

$$N_{100} = \frac{r_L}{\ln\left(\frac{r_L}{r_R}\right)}\left[\left(\frac{r_R}{r_L}\right)^{0.99} - \left(\frac{r_R}{r_L}\right)\right] \quad (10)$$

whereas the total counting rate (no dead time) is $$N_{total} = \frac{r_L}{\ln\left(\frac{r_L}{r_R}\right)}\left(1 - \frac{r_R}{r_L}\right) \quad (11)$$

So $$N_{100} = N_{total} \frac{\left[\left(\frac{r_R}{r_L}\right)^{0.99} - \left(\frac{r_R}{r_L}\right)\right]}{\left(1 - \frac{r_R}{r_L}\right)} = N_{total}(7.15 \times 10^{-5})$$
$$= 2 \times 10^5 \times 7.15 \times 10^{-5}$$
$$= 14.3 \text{ counts per second}$$

So the time required to fill all the previous channels and the 100th channel, without the dead-time circuit, if there were no cable capacity limitation, would be:

$$\frac{1000}{14.3} = 70 \text{ seconds}$$

This time may serve as the $T$ of Equations 3 and 9. There is one more quantity to be calculated to insert in Equation 9, and that is the right-hand rate $r_R$. From Equation 11, $$r_L = N_{total} \cdot \ln\left(\frac{r_L}{r_R}\right) \cdot \left(1 - \frac{r_R}{r_L}\right)$$
$$= 2 \times 10^5 \times 6.90 \times 0.999$$
$$= 13.8 \times 10^5$$

So $$r_R = \frac{r_L}{1000} = 1{,}380 \text{ counts per seconds}$$

Inserting this value into Equation 9 gives:

$$t'(1) = T\left(1 + \frac{r_R}{r_L}\right) = T\left(1 + \frac{1{,}380}{20{,}000}\right)$$
$$= T(1.069) \cong 75 \text{ seconds}$$

This is the time required to fill all the previous channels and the 100th channel with the dead-time circuit functioning. The remarkable thing is that with the dead-time circuit performing its very strong scaling action at the beginning of the collection of the spectrum, the collection process requires only 7 percent more time than would be required with no scaling whatsoever and no cable capacity limitation.

It will be appreciated that, without the dead-time circuit and with the cable capacity limitation, it would be necessary to scale down the rate of 200,000 counts per second by a factor of 10, so that the time required would be 10 times the 70 seconds calculated above, rather than just 7 percent more. In summary, simultaneous use of the dead-time circuit and the moving discrimination circuit has made the difference between a 1,000 percent increase and only a 7 percent increase in time for collection of the spectrum.

Another way of viewing the above result is to say that the dead-time circuit in conjunction with the variable discriminator makes it possible to cut down the collection time by a factor of $10/1.07 = 9.3$. It will be appreciated that, in logging terms, this means that a well logging instrument may move through the borehole 9.3 times as fast as would be possible without the variable discriminator plus the dead-time circuit.

FIG. 3 illustrates schematically one circuit capable of introducing variable discrimination into the system of FIG. 1. This circuit includes programmer 25, which operates in the manner indicated above to raise the bias level on discriminator 21 at a rate corresponding to Equation 3.

Programmer 25 must be a device that controls the discrimination voltage of variable discriminator 21, and in fact feeds that voltage into discriminator 21, the voltage variation being a definite function of time.

The function of time according to which the voltage must vary is implicitly given by Equation 9.

$$t'(x) = \frac{r_R}{r_L} T \left(\frac{r_L}{r_R}\right)^x + \frac{r_R}{r_L} T x$$

already derived in the specification.

The variable $x$ has already been defined as a fraction of an energy interval, that is, $$x = \frac{E - E_L}{E_R - E_L}$$

where $E_L$ is the "left-hand energy,"
$E_R$ is the "right-hand energy," and
$E$ is some intermediate energy,
as shown in FIG. 2.

Now it will be apreciated that $x$ may just as well represent a fraction of a voltage interval, so that when $x=0$, the voltage is at its left-hand, or lowest, value; when $x=1$, the voltage is at its right-hand, or highest, value; and when $x$ is between 0 and 1, the voltage is correspondingly somewhere between its lowest and highest desired values. So the above equation connecting $t'$ and $x$ is quite properly viewed also as an equation connecting time and voltage. Therefore, to save added terminology, let the equation merely be considered as an equation relating time and a voltage "$x$." It will now be shown how the voltage $x$ may be generated as a function of time in accordance with the above equation.

It is desired to control the voltage $x$ as a function of time according to the equation $$t'(x) = \frac{r_R}{r_L} T \left(\frac{r_L}{r_R}\right)^x + \frac{r_R}{n} T x \qquad (9)$$

but unfortunately, for electronic engineering purposes, this equation only expresses time as a simple function of $x$; it does not inversely express $x$ as a simple function of time. Indeed, the equation would become quite complicated and cumbersome if it were attempted to be inverted to give $x$ as an explicit function of $t'$. Therefore, it is necessary to have an electromechanical or other analogous arrangement that will produce $x$ as a function of $t'$ even though $x$ is only given implicitly by the above equation. The following arrangement, among others that could be devised, will produce the required function.

Reference is now made to FIG. 3 for a detailed description for programmer 25. First of all, it may be helpful to notice the input and output portions of the electromechanical circuit of this figure.

The time quantity $t'$ may be considered to be fed in by constant-speed motor 50. Actually, for convenience, the quantity $t'(x)/T$ is here represented by the rotation of the shaft of motor 50.

The desired voltage $x$ appears at the point 51. For clarity of the explanation, the voltage $x$ is shown multiplied by a constant voltage $E_s$, a base voltage for the circuit, but after the explanation is over, the voltage $E_s$ may be assumed to be unity, and the quantity $E_s x$ may be assumed to be merely $x$.

Referring again to FIG. 3, a constant base voltage $E_s$ is applied across the potentiometer 52 whose winding is logarithmic, so that the voltage taken off by moving contact 53 is proportional to the logarithm of the mechanical displacement of the moving contact 53. That mechanical displacement is proportional to a quantity $\tau$, which is generated further on in the circuit.

The base voltage $E_s$ is applied also across another potentiometer 54, which may be a linear potentiometer whose contact arm displacement is set proportionally to the logarithm of $r_R/r_L$ (the ratio of the right-hand rate to the left-hand counting rate). The voltage out of the contact 55 is $E_s \ln r_R/r_L$.

The two voltages out of the potentiometers 52 and 54 are apllied to the differential operational amplifier 56, which subtracts those voltages and applies the difference $E_s (\ln \tau - \ln r_R/r_L)$ across potentiometer 57. The contact arm 58 of potentiometer 57 is set proportionally to the quantity $1/\ln(r_L/r_R)$. It will be shown later, when the parts which generate the quantity $\tau$ are described, that the displacement of the arm 58 is proportional to $1/\ln(r_L/r_R)$. This quantity in effect multiples a voltage proportional to $E_s (\ln \tau - \ln r_L/r_R)$ by a voltage proportional to $1/\ln(r_L/r_R)$, and this must give a product proportional to the desired quanatity, $x$. The voltage $E_s x$ is sensed at contact arm 58, but instead of being used directly it is fed into buffer amplifier 59 which puts out a usable amount of power at the identical voltage $E_s x$, which voltage may now be applied across potentiometer 60, as well as taken out for external use at terminal 51.

The contact arm 61 of potentiometer 60 is set proportionally to the quantity $r_R/n$, and the voltage sensed by that arm is, therefore, $E_s x (r_R/n)$. This voltage is fed into amplifier 62, which operates servo motor 63, producing a shaft rotation proportional to the quantity $E_s x (r_R/n)$.

The two shaft rotations, the one proportional to $t'(x)/T$, already mentioned hereinbefore, and the other, proportional to $E_s x(r_R/n)$, are fed to the mechanical differential 64 in such a manner that the resultant rotation of the third shaft 65 of the differential is proportional to the difference $t'(x)/T-E_s x(r_R/n)$, which quantity is, for convenience, defined as $\tau$.

Finally (as far as the description of the circuit itself is concerned), the rotation of the third shaft 65 of differential 64 is applied to the potentiometer contact arm 53 already mentioned. It will be observed that this circuit is in a closed loop. Shaft 65, whose rotation is proportion to $\tau$, connects the last parts described with some of the first parts described.

It can be verified mathematically that if the operations and connections are made as described above, the quantity $x$ will be related to the quantity $t'$ in accordance with the equation given hereinbefore (letting $E_s=1$).
If $$\frac{t'(x)}{T} = \frac{r_R}{r_L}\left(\frac{r_L}{r_R}\right)^x + \frac{r_R}{n}x$$

letting $$\tau \equiv \frac{r_R}{r_L}\left(\frac{r_L}{r_R}\right)^x$$

then $$\tau = \frac{t'(x)}{T} - \frac{r_R}{n}x$$

also $$\ln \tau = \ln (r_R/r_L) + x \ln (r_L/r_R)$$

so that $$x = \frac{\ln \tau - \ln (r_R/r_L)}{\ln (r_L/r_R)}$$

So, in spite of the fact that $x$ cannot be mathematically expressed as a convenient explicit function of time, the circuit described above, and represented in FIG. 3, puts out a voltage of the proper form at terminal 51 when time is fed in as a shaft rotation by motor 50.

From the foregoing description, it will now be seen that the invention provides a new method to transmit pulses that represent gamma rays detected along a well bore to a multichannel analyzer at the earths' surface. This method emphasizes the high-energy portion of the spectrum and does not substantially increase the total measuring time of a complete spectrum. The particular advantage of the arrangement is that the multichannel pulse-height analyzer can be positioned at the earth's surface and the electrical pulses representing the gamma rays can be transmitted from deep in the well bore over a conventional well logging cable of limited power and frequency characteristics. In this method the high-energy portion of the spectrum is emphasized by progressively increasing the minimum amplitude of electrical pulses sent over the logging cable to the recorder. When all pulses are available through the variable amplitude discriminator, the pulses are scaled or dead-timed to prevent pulse pile-up or oversaturation of the logging cable; but the scaling function becomes inoperable when the variable amplitude discriminator emphasizes the less frequently occurring gamma rays at the high-energy end of the spectrum.

While only one from of apparatus has been shown for performing the method of the invention, it is obvious that equivalent means can be devised for performing the same functions without departing from the inventive concept. All modifications and changes that come within the scope of the attached claims are intended to be included.

I claim:

1. A method of emphasizing the high-energy portion of a gamma-ray spectrum without substantial increase in measuring time, when electrical pulses representing gamma rays are generated in a well bore, transmitted over a logging cable having limited information transmission characteristics, and recorded on a multichannel pulse-height analyzer at the earth's surface, which comprises
    (a) generating in said well bore a plurality of electrical pulses, each pulse being proportional in height to the energy of a gamma ray detected in the well bore,
    (b) in each spectrum to be recorded, selecting at random a first one of said plurality of electrical pulses for transmission to the pulse-height analyzer at the earth's surface, said first pulse having at least a predetermined minimum amplitude,
    (c) rejecting all succeeding electrical pulses for a known time period following selection of said pulse, said time period being sufficient to permit said first pulse to be transmitted with minimum distortion,
    (d) repetitively selecting at random another of said electrical pulses after the end of said time period, rejecting succeeding electrical pulses during each of said time periods, the number of repetitions being adequate to accumulate a statistically reliable sample of the amplitudes of all of said pulses for production of a pulse-height spectrum, and
    (e) during each repetitive selection and transmission of one of said pulses, progressively increasing the minimum amplitude of the selected pulse for transmission to the multichannel analyzer whereby the higher energy pulses are emphasized in the recorded spectrum.

2. A method of emphasizing the high-energy portion of a gamma-ray spectrum without substantial increase in measuring time of a complete spectrum, when electrical pulses representing the energy of individual gamma rays are generated in a well bore, transmitted over a logging cable having limited information transmission characteristics, and recorded on a multichannel pulse-height analyzer at the earth's surface, which comprises
    (a) discriminating electrically to eliminate any of said pulses below a minimum amplitude,
    (b) in each spectrum to be recorded, selecting at random a first one of said plurality of minimum amplitude pulses for transmission to the pulse-height analyzer at the earth's surface,
    (c) rejecting all succeeding electrical pulses for a known time period following selection of said pulse, said time period being sufficient to permit said pulse to be transmitted with minimum distortion,
    (d) repetitively selecting at random another of said minimum amplitude pulses after the end of said time period, rejecting succeeding electrical pulses during each of said time periods, the number of repetitions being adequate to accumulate a statistically reliable sample of the amplitudes of all of said pulses for production of a pulse-height spectrum, and
    (e) during each repetitive selection and transmission of one of said pulses, progressively increasing the minimum amplitude of the selected pulse for transmission to the multichannel analyzer whereby the higher energy pulses are emphasized in the recorded spectrum.

3. A method of emphasizing the high-energy portion of a gamma-ray spectrum without substantial increase in measuring time of a complete spectrum, when electrical pulses representing the energy of individual gamma rays are generated in a well bore, transmitted over a logging cable having limited information transmission characteristics, and recorded on a multichannel pulse-height analyzer at the earth's surface, which comprises
    (a) discriminating electrically to eliminate any of said pulses below a minimum amplitude,
    (b) in each spectrum to be recorded, selecting at random a first one of said plurality of minimum amplitude pulses for transmission to the pulse-height analyzer at the earth's surface, (c) rejecting all succeeding electrical pulses for a known time period following selection of said pulse, said time period being sufficient to permit said pulse to be transmitted with minimum distortion, (d) repetitively selecting at random another of said minimum amplitude pulses after the end of said time period, rejecting succeeding electrical pulses during each of said time periods, the number of repetitions being adequate to accumulate a statistically reliable sample of the amplitudes of all of said pulses for production of a pulse-height spectrum, (e) during each repetitive selection and transmission of one of said pulses, progressively increasing the minimum amplitude of the selected pulse for transmission to the multichannel analyzer whereby the higher energy pulses are emphasized in the recorded spectrum, and (f) recording said pulses in accordance with the depth where said gamma rays are measured in the well bore.

4. The method in accordance with claim 3 in which said minimum amplitude of said selected pulse is progressively increased in steps of predetermined amplitudes.

5. The method in accordance with claim 4 in which said steps of predetermined amplitudes are substantially equal to the energy widths of each channel in the multichannel analyzer.

6. The method in accordance with claim 5 in which said steps of predetermined amplitude are made when the total number of pulses collected in each channel is the same and the time variation in each step is recorded.

7. The method of recording a gamma-ray energy spectrum of an earth formation traversed by a well bore to identify the unknown nuclei of materials in said formation from the spectral peaks, said spectrum being generated by a neutron source irradiating the earth formation, a scintillation detector positioned adjacent the neutron source, a multichannel pulse-height analyzer at the earth's surface, and a well logging cable having limited information transmission characteristics for interconnecting the scintillation detector and the multi-channel pulse-height analyzer, said scintillation detector being adapted to generate electrical pulses each of which has a characteristic proportional to the energy of the gamma ray absorbed in said detector, the improvement in the recording of each spectrum which comprises (a) discriminating the threshold amplitude of pulses supplied by said detector to said cable for transmission to the multichannel pulse-height analyzer to admit any pulse above a predetermined minimum level at the beginning of each spectrum, (b) progressively blocking out transmission of lower-energy pulses as the spectrum is recorded, and (c) during at least the early portion of the recording of each spectrum blocking off transmission of all subsequent pulses for a time adequate to permit a characteristic pulse to be transmitted over said cable to the multichannel pulse-height analyzer whereby the high-energy portion of the gamma-ray spectrum is substantially emphasized and the low-energy portion is de-emphasized without substantial increase in the measuring time for the complete spectrum.

8. A well logging method to emphasize the high-energy portion of a gamma-ray spectrum without substantially increasing the measuring time of a complete spectrum, said logging method including (a) the generation and detection of gamma rays in an earth formation traversed by a well bore, the energy of said gamma rays being represented by electrical pulses one of whose characteristics is representative of the energy of said gamma ray, (b) transmitting said gamma-ray pulses over a logging cable of limited information characteristic, and (c) recording said pulses in a multichannel pulse-height analyzer positioned at the earth's surface, the improvement which comprises (1) variably discriminating the lower amplitude of said electrical pulses accepted for transmission over said cable to progressively increase the minimum energy of said pulses received during the collection of pulses in said analyzer to form said spectrum and (2) during transmission of pulses of the lowest energy over said cable to form said spectrum at said analyzer limiting the number of pulses available for transmission to avoid pulse pile-up in said cable.

9. The method of recording at the earth's surface only the peaks in a pulse-height spectrum of gamma-ray energies measured in a well bore which includes a gamma-ray energy detector positioned in an elongated housing and said housing supported by an electrical cable of limited power and frequency characteristics which comprises (a) converting each gamma ray interacting with said detector to an electrical pulse, at least one characteristic of said pulse representing the energy of said interaction, (b) electrically discriminating said pulses to eliminate pulses below a predeterminable minimum value, (c) then selecting one of said pulses for transmission to said cable and a multichannel pulse-height analyzer positioned at the earth's surface, (d) transmitting said one pulse over said cable to a pulse height analyzer, (e) during transmission of said one pulse over said cable dead-timing the selection of the next pulse to prevent overlap of said preceding pulse, and (f) programming the discrimination of said pulses prior to transmission over said cable progressively to change said predetermined minimum value throughout collection of all said pulses to form said spectrum whereby only the peaks in said pulse-height spectrum are recorded by said analyzer at the earth's surface.

References Cited by the Examiner

UNITED STATES PATENTS

| | | | |
|---|---|---|---|
| 2,870,436 | 1/1959 | Kuder | 340—206 X |
| 2,942,112 | 6/1960 | Hearn | 250—83.6 X |

RALPH G. NILSON, *Primary Examiner.*

ARCHIE BORCHELT, *Examiner.*